United States Patent [19]
Schmitt

[11] 4,013,277
[45] Mar. 22, 1977

[54] DEVICE FOR POSITIONING A CUTTING TORCH AGGREGATE

[75] Inventor: Ewald Schmitt, Bischofsheim, Germany

[73] Assignee: Messer Griesheim GmbH, Frankfurt am Main, Germany

[22] Filed: Apr. 9, 1975

[21] Appl. No.: 566,395

[30] Foreign Application Priority Data

Apr. 11, 1974 Germany .......................... 2417694

[52] U.S. Cl. ................................ 266/76; 266/902
[51] Int. Cl.² .......................................... B23K 7/10
[58] Field of Search ........... 148/9; 266/23 R, 23 M, 266/23 RC, 23 NN, 76, 902

[56] References Cited

UNITED STATES PATENTS

| | | | |
|---|---|---|---|
| 2,249,413 | 7/1941 | Bechtle et al. ................... | 266/23 M |
| 2,336,596 | 12/1943 | Chouinard ...................... | 266/67 X |
| 2,364,645 | 12/1944 | Mott et al. ...................... | 266/23 M |
| 2,521,222 | 9/1950 | James et al. ..................... | 266/23 |
| 2,578,778 | 12/1951 | Biach ............................... | 266/23 |
| 3,382,112 | 5/1968 | Oxley et al. .................... | 266/23 RC |
| 3,595,545 | 7/1971 | Sitnichenko et al. ............. | 266/76 |

FOREIGN PATENTS OR APPLICATIONS

| | | | |
|---|---|---|---|
| 2,204,992 | 8/1973 | Germany ........................ | 266/23 M |
| 534,714 | 3/1941 | United Kingdom .......... | 266/23 NN |
| 546,098 | 6/1942 | United Kingdom .......... | 266/23 NN |
| 735,875 | 8/1955 | United Kingdom .......... | 266/23 NN |
| 900,121 | 7/1962 | United Kingdom ............ | 266/23 R |

*Primary Examiner*—Roy Lake
*Assistant Examiner*—Paul A. Bell
*Attorney, Agent, or Firm*—Connolly and Hutz

[57] ABSTRACT

A device for positioning a cutting torch aggregate includes a movable sled for carrying the torch. The sled is connected by means of a spindle to an adjustable drive which is activated by its engagement with a nut which mounts the sled to the spindle. The nut activates a control for the drive.

5 Claims, 3 Drawing Figures

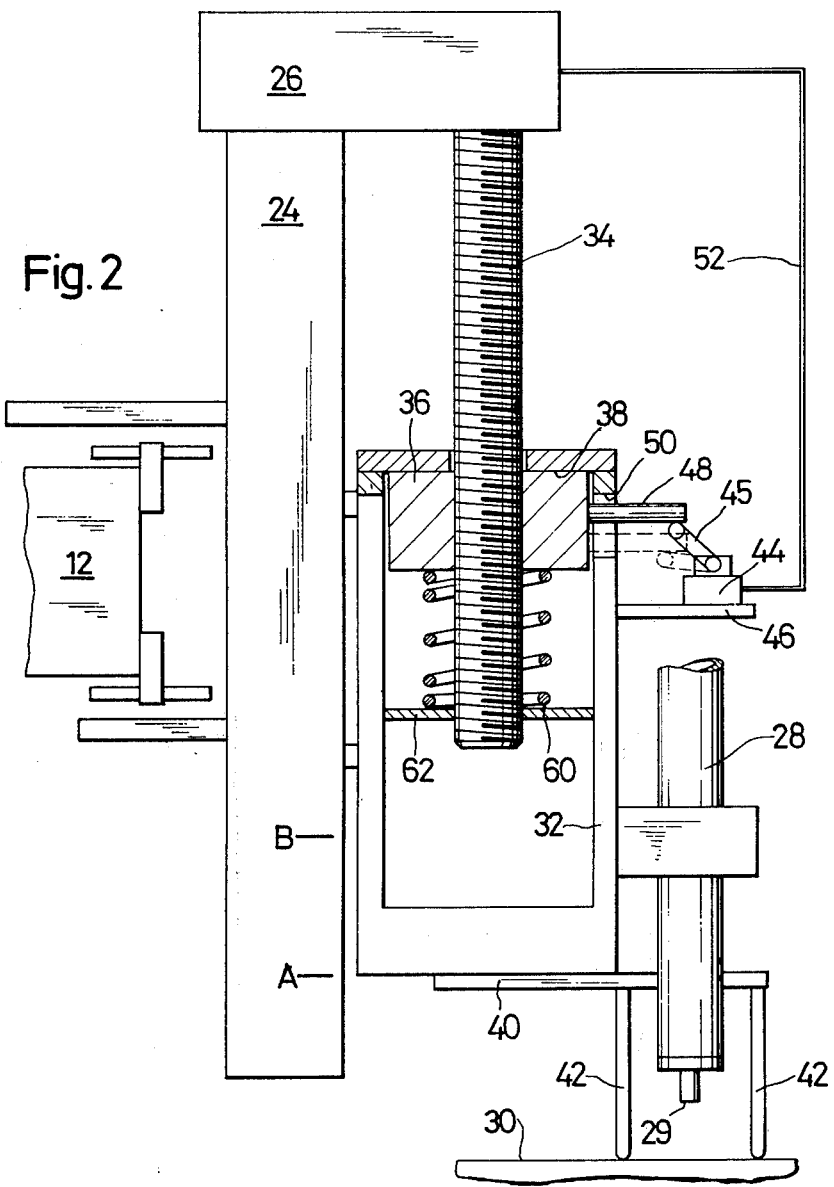

DEVICE FOR POSITIONING A CUTTING TORCH AGGREGATE

BACKGROUND OF THE INVENTION

The invention relates to a device for positioning a cutting torch aggregate over the surface of workpieces, in particular strands, slabs or the like with a sled, adjustably mounted in the cutting torch aggregate. The sled carries the torch and is connected via a spindle with its adjusting drive. When cutting strands with a cutting torch, it occurs again and again, that after the cutting through the strand of one thickness there is subsequently a strand of another thickness to be cut. It is then necessary to adapt the one or more cutting torch aggregates to the new thickness of the strand, i.e. to shift so far in the position of the torch to the surface of the strand, that a uniform distance between torch and surface exists for all thicknesses, for the obtaining of an optimum cut, independent of the thickness of the workpiece (strand, slab, or the like).

It is known to carry out this height adjustment manually, i.e. the torches are driven by the operating crew toward or away from the surface of the rope, until the distance required for the cutting, between torch and workpiece, is obtained. This adjustment of the distance is often carried out by measure, by eye, or, if necessary, by measuring directly on torch and workpiece.

SUMMARY OF THE INVENTION

The object of the present invention is to create a device, by means of which the height adjustment of the torch aggregates is carried out automatically at the always right distance independently of the thickness of the workpiece to be cut.

For the solution of the above-mentioned problem it is proposed according to the invention that a control member is fastened on the sled, which is connected with the adjusting drive of the sled, and can be operated via a nut which mounts the sled to the spindle.

Therefore, with the device according to the invention, it is possible to align the cutting torch always at its optimum distance on workpieces of different thickness. Thus results in an advantageous way from the fact that the torch aggregate always proceeds from its starting position to the surface of the workpiece. This distance which the torch aggregate has traveled (from starting position to surface) is different in size depending upon the thickness of the workpiece. The return path from the surface into the cutting position above the strand is given in advance as an empirical value, and is mostly constant. In order to be able, after placing the cutting torch aggregate on the surface of the workpiece, to reverse the adjusting drive of the sled, it is provided according to the invention, that a bolt be arranged for the nut. The bolt in turn forms an effective connection with a calipers lever which thereby functions as a control member.

In one embodiment, the reversal of the drive proceeds via an electrical switch. However, it is also possible and is within the scope of the invention, to carry out the control of the spindle drive, via pneumatic or hydraulic control valves.

A further feature of the invention is to include a spacer provided for the torch and fastened to the sled. This guarantees that the torch does not come into direct contact with the surface of the workpiece and thereby avoids damage to the torch since it is the spacer and not the torch which contacts the surface of the workpiece. It is self-evident that, upon the returning of the torch into the cutting position, for the correct distance of the torch to the workpiece, the distance between the bearing face of the spacer, and in face front of the torch nozzle is considered correspondingly.

In a preferred embodiment of the invention the nut is held by a spring at the internal wall of the sled. By this embodiment it is possible also in advantageous way to arrange the cutting torch aggregate horizontally, for the cutting of vertical strands.

Alternatively, it is also possible and lies within the scope of the invention that a piston-cylinder aggregate is provided for the sled, by which the constant contact of the internal wall of the sled and the nut is guaranteed.

THE DRAWINGS

FIG. 2 is an enlarged view partly in section of a portion of the cutting torch aggregate shown in FIG. 1.

DETAILED DESCRIPTION

Figure 1:
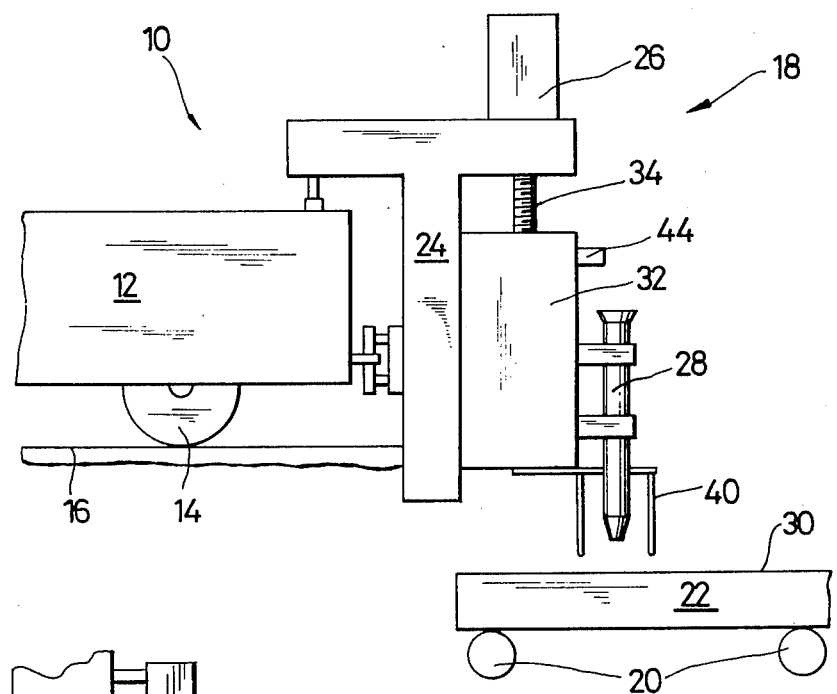
FIG. 1 illustrates the cutting torch aggregate of a torch-cutting machine in simplified form.

The front portion of a torch-cutting machine 10 is shown in FIG. 1 and comprises a machine wagon 12, having wheels 14 which can be driven on guide rails 16. At the right end of the machine wagon 12, shown in FIG. 1, there is arranged transversely displaceably, with respect to the direction of drive of the machine wagon, at least one cutting torch aggregate 18. By means of this cutting torch aggregate, the workpiece 22 (e.g. a strand, slab, etc.) mounted on a roller table 20 is cut into sections.

The cutting torch aggregate 18 according to the invention is represented in enlarged form in FIG. 2. The aggregate 18 has a guide member 24, at whose upper end is provided an adjusting drive 26 for the sled. The adjusting drive 26 serves for moving the cutting torch 28 back and forth in the direction of the surface 30 of the workpiece 22.

On the guide member 24 there is displaceably mounted in a vertical direction, a sled 32 connected with spindle 34 of the adjusting device 26, via a nut 36. As can be seen in FIG. 2, the spindle 34 projects into the inside of the sled 32 and carries on this internal end the nut 36. Because of the own weight of the sled, the latter rests with its inner wall 38 on the nut 36.

The cutting torch 28 is fastened to sled 32. Furthermore, a spacer 40 is provided on the sled. Spacer 40 because of its two feet 42, projects to a certain extent beyond the front 29 of the cutting torch 28, as can be seen from FIG. 2. Advantageously, spacer 40 prevents the cutting torch 28 when the aggregate 18 is driven to the surface 30, from striking the surface 30 and thus damaging the torch.

As FIG. 2 shows furthermore, there is at the upper end of the sled 32 a control member, e.g. end calipers 44, fastened by means of an arm 46. Calipers 44 acts together with the nut 36 in a way, as later described. The nut 36 comes into contact with a stud or bolt 48 through a recess 50 of the sled 32 and projects out of the interior of the sled, and thus establishes connection with the lever 45 of the end calipers 44. The end calipers are connected via a control line 52 with the adjusting drive of the sled 26.

The positioning of the cutting torch aggregate with the arrangement described above takes place as follows. After the cutting torch machine has been clamped by means of its clamping device (not shown) on the slowly moving workpiece 22 the torch aggregate 18 is shifted as much as necessary transversely to the longitudinal direction of the strand length until the one or several torches 28 are arranged above the surface 30.

Then the adjusting drive 26 is switched to rotate spindle 34 which cause relative movement between spindle 34 and nut 36. The sled 32 carrying the torch 28 rests on nut 36 because of its own weight of the sled (in addition to the weight of the torch, spacer and end calipers). Accordingly, rotation of spindle 34 which causes nut 36 to lower results in sled 32 being moved in the direction to the surface of the workpiece 30. A co-rotating of the nut 36 in the same direction of rotation as the spindle 34 is prevented by the frictional contact of the nut with the inside wall 38 of the sled.

The sled 32 then comes in contact with the surface 30 of the workpiece, by means of the spacer 40 and any further downward movement is prevented. For a short period the nut 36 continues to move further downward until such movement is also prevented. In this case, a co-rotation of the nut is prevented by the bolt 48 which extends through vertical slit 50. When bolt 48 reaches the bottom of slit 50 (as shown in phantom) nut 36 is stopped from further downward movement. At this point, when bolt 48 is at the bottom of slit 50, lever 45 of the control member 44 is activated. By activation of control member 44, the adjusting drive is reversed in polarity via the control conduit 52 and the spindle 34 rotates in an opposite direction.

Slit or recess 50 thus limits the movement of the bolt 48 and thereby prevents further rotary motion of the nut, so that the latter is necessarily moved upwardly by the spindle (FIG. 2). At this upward motion, the nut comes again in contact with the internal wall 38 and carries the sled 32 and the parts fastened to it upward. When the frontal area 29 of the cutting torch 28 has reached a predetermined distance from the surface 30 of the workpiece the drive 26 disconnects. The cutting torch is thus positioned at the right distance from the surface of the workpiece and is then moved by the aggregate 18 into the cutting position.

The right height-distance, set in advance, of the cutting torch from the surface of the workpiece can be obtained in different ways. When, for example, the minimum distance of the cutting torch 28, upon spacer 40 contacting the surface 30, amounts to 10 millimeters and the optimum cutting distance 50 millimeters, it is merely necessary to move the sled with the cutting torch still 40 millimeters toward above. This stroke motion can be controlled via a tachometer. At a stroke motion of, for example, two millimeters per spindle rotation, the adjusting drive would then be disconnected by the tachometer after twenty spindle rotations, including the predeterminable number of the spindle rotations for the "free" motion of the nut 36. Instead of a tachometer a timing relay can also be used which after a pre-given time at known stroke velocity disconnects the adjusting drive.

In the present exemplified embodiment, the sled 32 was lowered to the position A. In the case of a thicker workpiece, the sled lowers for example only to the position B. Also after reaching this position the nut 36 continues to move downwardly freely and activates thereby the control member 44, so that the direction of the spindle rotation is reversed.

The adjustment of the distance of the cutting torch from the surface of the workpiece takes place therefore independently of the thickness of the workpiece to be cut through in each case. The cutting torch aggregate, which can be adjusted in height, rather adjusts itself by its sled to the thickness of the workpiece in each case, so that thereby the cutting torch is then moved back into the right, predetermined position which guarantees an optimum cut.

The above-described exemplified embodiment refers to a gas-cutting machine for the separating of horizontally arranged workpieces. However, it is also possible to provide the device according to the invention, on vertical casting units whereby a vertical segment is cut. For this purpose it is merely required to turn the cutting torch aggregate, according to FIG. 2, 90° and thus dispose it horizontally. In order to be able in this case to maintain the operational functioning of the cutting torch aggregate, a spring 60 is coordinated to the nut 36 which reacts at one of its ends against the nut and at its other end against a plate 62 inside the sled 32. By this spring it is guaranteed that, because of the nut, the now horizontally moving sled is always taken along in the direction of movement towards the workpiece.

Figure 3:
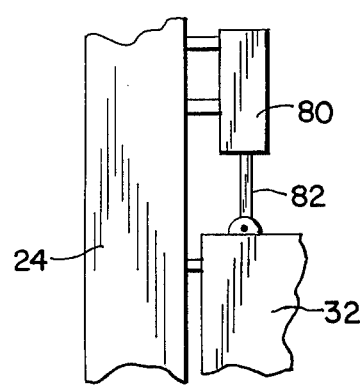
FIG. 3 is a fragmentary view similar to FIG. 1 showing a modified form of this invention.

Instead of using a spring, it is alternately also possible, according to the invention, to take care of the constant position of the internal wall 38 of the sled 32 on the nut 36 by a piston-cylinder-aggregate which would urge the internal wall 38 against nut 36. For this purpose, as illustrated in FIG. 3 the aggregate is fastened to guide member 24 in any suitable manner such as by mounting cylinder 80 thereto, and is hinged with its piston-rod 82 at the sled 32. The aggregate is adjusted to a low preliminary pressure which is sufficient that the internal wall 38 of the sled is always pressed against the nut 36 upon extension of the piston rod. In this way, likewise, a constant movement of the sled by the nut is guaranteed.

What is claimed is:

1. A device for positioning a cutting torch aggregate a predetermined distance from a workpiece comprising, in combination, a movable sled as part of said aggregate, torch means mounted to said sled for joint movement therewith, drive means for moving said sled up and down toward and away from the workpiece, said drive means including a spindle, means for rotating said spindle, a nut engaged with said spindle mounted for relative movement with respect thereto, said sled disposed for resting against said nut whereby the vertical positioning of said sled is determined by the relative movement of said nut, spacing means mounted to said sled and extending beyond said torch means for contacting the workpiece when said torch means is closer than the predetermined distance while said nut is being moved in its relative lowering direction, control means on said sled and said nut and connected to said spindle rotating means for reversing the direction of relative movement of said nut to its raising direction upon contact of said spacing means with the workpiece to thereby raise said sled until said torch means is at said predetermined distance, said control means including a movable control lever which activates said rotating means when said control lever is in a predetermined position, a stud connected with said nut for joint movement therewith, and said control lever being in the path of movement of stud whereby said control lever may be moved to said predetermined position upon contact by said study.

2. The device of claim 1 wherein said sled has an internal wall disposed for resting upon said nut, and urging means for maintaining said nut in contact with said internal wall whereby said sled is moved up and down in response to the relative movement of said nut.

3. The device of claim 2 wherein said urging means comprises resilient means reacting against said nut and urging said nut into contact with said internal wall.

4. The device of claim 2 wherein said urging means comprises resilient means reacting against said nut and urging said nut into contact with said internal wall.

5. The device of claim 1 wherein said control lever is mounted to said sled externally thereof, a vertical slot in said sled above said control lever, and said stud extending through said slot.

* * * * *